United States Patent [19]

Tempe

[11] Patent Number: 5,628,812
[45] Date of Patent: May 13, 1997

[54] METHOD AND INSTALLATION FOR VENTILATING AND CONTROLLING A BIOLOGICAL DEHYDRATION AND STABILIZATION TREATMENT OF A MOIST FERMENTABLE ORGANIC PRODUCT

[76] Inventor: Maurice Tempe, 11 Rue des Bijoutiers, 30300 Beaucaire, France

[21] Appl. No.: 476,784

[22] Filed: Feb. 8, 1990

[30] Foreign Application Priority Data

Feb. 8, 1989 [FR] France .................. 89 01609

[51] Int. Cl.⁶ .................. C05F 9/04; C05F 9/02
[52] U.S. Cl. .................. 71/9; 71/23; 435/290.1
[58] Field of Search .................. 71/9, 23; 422/784; 435/290.1

[56] References Cited

U.S. PATENT DOCUMENTS

| | | | |
|---|---|---|---|
| 3,138,448 | 6/1964 | Schulze | 71/9 |
| 3,285,732 | 11/1966 | Schulze | 71/9 |
| 3,314,765 | 4/1967 | Abson et al. | 71/9 X |
| 3,895,916 | 7/1975 | Rösner | 422/242 |
| 3,976,245 | 8/1976 | Cole | 236/93 A |
| 4,062,770 | 12/1977 | Kneer | 71/9 X |
| 4,211,545 | 7/1980 | Graefe | 71/9 |
| 4,339,265 | 7/1982 | Engelmann | 71/9 |
| 4,483,704 | 11/1984 | Easter, II | 71/9 |
| 4,521,517 | 6/1985 | Gauthier | 71/9 |

FOREIGN PATENT DOCUMENTS

| | | | |
|---|---|---|---|
| 0112996 | 7/1984 | European Pat. Off. | |
| 1592729 | 2/1967 | Germany | 71/23 |
| 676123 | 7/1952 | United Kingdom | |
| 886485 | 1/1962 | United Kingdom | |

*Primary Examiner*—Ferris Lander
*Attorney, Agent, or Firm*—Longacre & White

[57] ABSTRACT

This generally concerns the treatment of a moist fermentable organic product (10) involving circulation of air through the product controlled in accordance with the value of a parameter related to its state.

In accordance with the invention, the measured value of the parameter concerned is compared with a specific value programmed in advance and regarded as ideal for the current air flowrate and this air flowrate is modified if the measured value of this parameter departs from this ideal value.

23 Claims, 2 Drawing Sheets

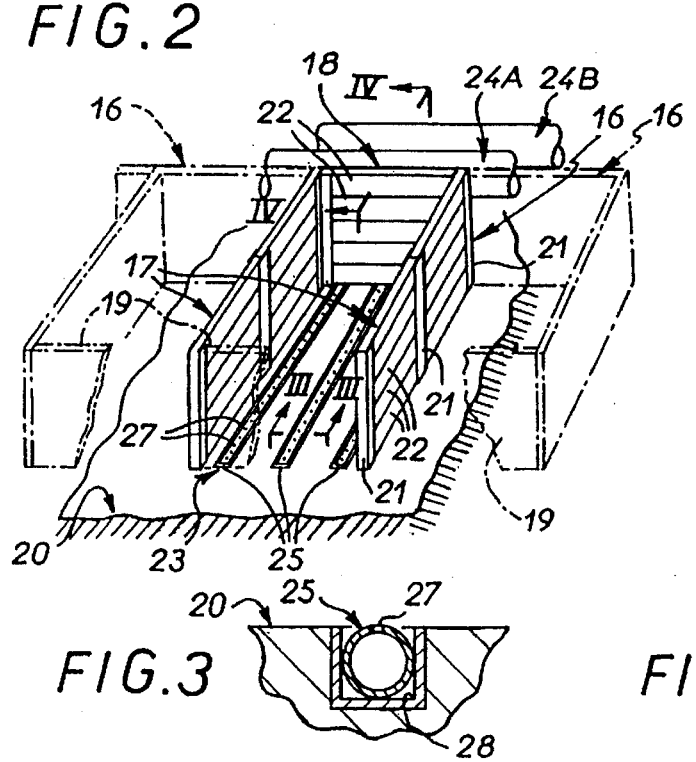
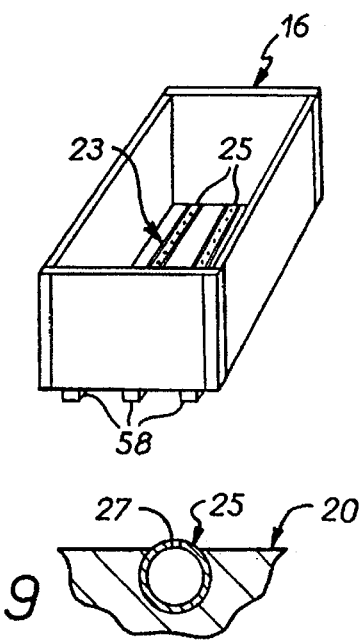
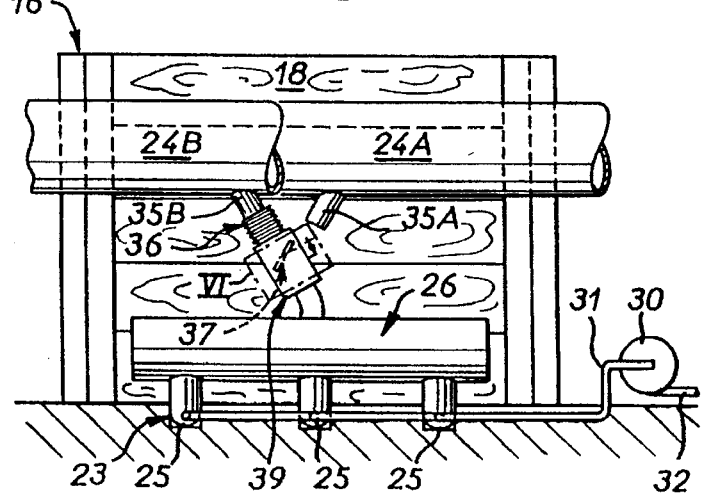
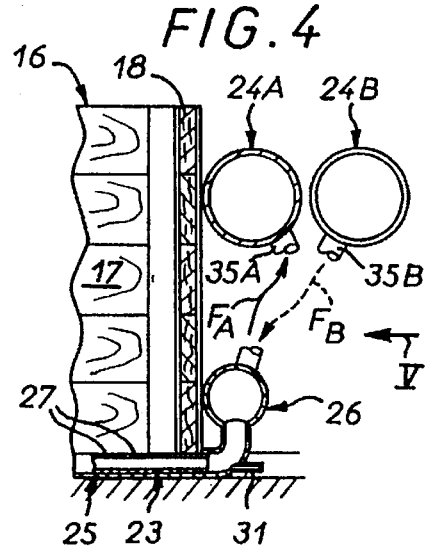
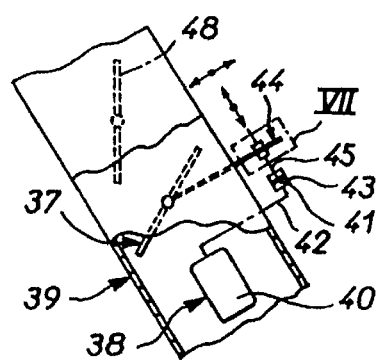

METHOD AND INSTALLATION FOR VENTILATING AND CONTROLLING A BIOLOGICAL DEHYDRATION AND STABILIZATION TREATMENT OF A MOIST FERMENTABLE ORGANIC PRODUCT

The present invention is generally concerned with the treatment of moist fermentable organic products which would normally otherwise be discharged, denatured, drained away or destroyed.

In practise, this usually concerns industrial or agricultural waste such as effluent sludge, for example but it may equally well be surplus agricultural produce resulting from the need to maintain prices by artificial means.

Consideration has been given to treating organic products of this kind by applying to them the rustic composting technique which involves spreading them in swaths either on their own or mixed with other organic products in order to produce soil and/or growth substrate improvement products.

As is known, when various organic products are mixed together they begin to ferment.

In the presence of air this is aerobic fermentation or composting.

Such fermentation consumes oxygen and is accompanied in particular by an increase in temperature, the generation of carbon dioxide and the production of water.

In the case of rustic composting, the necessary supply of oxygen is facilitated by turning over the swaths from time to time.

However, the corresponding composting time is relatively long, in the order of six months on average, and the area of land taken up is considerable.

What is more, in this time period it is necessary to turn over the swaths two or three times, requiring the use of appropriate plant and labor.

Also, a relatively large supply of auxiliary products serving as carbon-bearing supports is usually required, which is prejudicial to the overall cost of the exercise, and the quantities of residual products obtained, considerable in themselves, notably in terms of their weight as they still have a very high water content, can be difficult to dispose of on the market.

Finally, controlling smells is a problem when treating some products, with resulting environmental nuisance.

To accelerate the composting process in particular so as to reduce the time it takes various solutions have been put forward, generally employing forced aeration with air or gas being blown or sucked in.

These solutions are mentioned, for example, in the preamble to French patent No 2 523 953 filed under application No 82 05139.

They are identified there as being unsuitable for industrial scale exploitation.

As mentioned in French patent No 2 519 972 filed under application No 82 00949, it has also been proposed to control the respiratory activity of the products being treated by modulating the flowrate of air blown into them in accordance with a parameter such as the carbon dioxide content of the exhaust gas or the temperature, in practise the temperature of the products themselves, regarded as being representative of the degree of such activity.

However, experience shows that such control is not able to achieve satisfactory industrial scale exploitation.

An object of the present invention is a process and an installation for biological treatment of a moist fermentable organic product that are advantageously suitable for satisfactory industrial scale exploitation.

It is based on the new discovery that any parameter assumed to be related to the state of the product being treated is not fully representative of the energy level thereof.

Experience indicates, and tests confirm, that this energy level, which in the final analysis is the only parameter to be taken into consideration, depends also on the age of the product, that is to say the time that has elapsed since its treatment was begun.

Building on this foundation, the ventilation and control method in accordance with the invention, which is of the kind whereby air is made to circulate through the product to be treated with the corresponding air flowrate controlled and this entailing the measurement of the value of a parameter related to the state of the product, is generally characterized in that the measured value of the parameter concerned is compared with a specific value programmed in advance and regarded as an ideal value for the current air flowrate and the air flowrate is modified if the measured value departs from this ideal value.

Thus in accordance with the invention control is superimposed on programming.

Because it is relatively easy to measure, the parameter to be measured is preferably a temperature but not the temperature of the product itself, which can vary according to where the temperature is measured, but the temperature of the exhaust air which advantageously integrates to a greater or lesser degree any variations in the former temperature.

It has been found that once a particular time, in the order of one week, for example, has elapsed it is advantageously possible to adopt for the ideal exhaust air temperature, at least to a first approximation, a value changing in a substantially linear way.

This substantial linearity has the advantage of being relatively easy to comply with.

To reduce surface cooling of the treated product and to prevent in this way unwanted condensation thereon the product is preferably given, in accordance with the invention, at least some lateral protection, such lateral protection extending over at least half its height, for example.

The circulation of air is preferably achieved for the most part by aspiration from the bottom of the product to be treated.

In this way the layer of the product through which the air exhausts is the bottom layer.

Apart from the fact that this bottom layer is totally thermally protected by the upper layers, the air passing through it is warm because it has passed through these upper layers.

This has the advantage that its temperature remains systematically high and if, despite this, some condensation occurs the corresponding moisture is quickly drained from the product by gravity without remoistening any significant part of it.

Even if, because of rain, the upper layers of the product are remoistened to some degree, any such remoistening has virtually no effect on how the product changes.

It affects only a part of the product that has already been fermented as necessary and is cold and dry.

Thus, if required, the treatment method in accordance with the invention can advantageously be practised in the open air.

Finally, because the air passing through the product being treated is drawn off through the bottom of the product, the treatment method in accordance with the invention is favorable to systematic and virtually total elimination of the smells generated by the product, such smells being essentially due to substances which, condensed with the water conveyed by the exhaust air, are then entrained by the latter and evacuated with it.

It should be emphasized that, while similar to composting and in particular composting accelerated by forced aeration, having in common with this process exploiting local production of energy, the treatment method in accordance with the invention is clearly distinguished from it.

Firstly, being directed to maximal removal of the water content of the treated product, it rapidly procures significant dehydration and therefore stabilization of the product.

From this point of view, it is therefore more of a dehydration and stabilization treatment than a composting treatment.

Furthermore, if the product is optionally mixed before treatment with at least one other product adapted to confer on the combination structural characteristics of a kind to facilitate the circulation of air in the mixture, such other product, whether it is a carbon-bearing support or an inert product, is involved to only a limited degree, if at all, in the actual treatment of the product to be treated whereas, in composting, it is usually a carbonated support of this kind that is degraded and not the waste materials which are added to it.

As a result, using the treatment method in accordance with the invention some at least of this other product may, if required, be recycled, with economic and other advantages.

To summarize, the treatment in accordance with the invention:

advantageously procures a significant reduction in the necessary fermentation time, which fermentation time can be reduced to approximately one month or even less, advantageously procures a significant reduction in the water content of the residual product, as this water content measured as a percentage relative to the raw product can in practise be reduced by at least half, with a proportionate reduction in the weight of the residual product and therefore with a significant saving in terms of its transportation and/or discharge costs, enables excellent control over malodorous emanations, enables recovery of energy from the exhaust air without prejudice to the fermentation process, consumes only relatively small quantities of any other product that might be added to structure the combination, has low labor and energy costs, and requiring no fragile or costly plant, can advantageously be implemented in installations that are relatively simple and therefore economical to build, reliable and rugged.

Another object of the present invention is an installation of this kind.

The installation comprises at least one reactor.

In one specific preferred embodiment the reactor comprises at its base a perforated network adapted to enable air to circulate through the product to be treated with at least one so-called primary feed-pipe which, once connected to the perforated network, is adapted to procure an effective circulation of air in the latter.

Other embodiments are feasible, however.

Be this as it may, there is preferably provided a parallel battery of such reactors each corresponding to a different state of evolution of the treated product.

This advantageously minimizes the overall power requirement through rational optimization of power utilization.

As for the residual product obtained at the end of the treatment method in accordance with the invention, this can be a directly usable product, in particular a product usable as a soil or growth substrate improvement product, livestock feed or fuel.

However, it may also be a semi-finished product that it is desirable to process further, for example by adding one or more constituents, before it is marketed.

In all cases, and as already mentioned above, its reduced water content advantageously facilitates handling and storing it.

Furthermore, it is found that the treatment method in accordance with the invention procures a physical transformation of the products to which it is applied with the result that the latter become remarkably fluid which further facilitates handling them and which in particular facilitates screening them if any such screening is required.

BRIEF DESCRIPTION OF THE FIGURES

The characteristics and advantages of the invention will emerge from the following description given by way of example with reference to the appended diagrammatic drawings in which:

FIG. 2 is a perspective view of an installation for implementing this method;

FIG. 3 is a partial view to a larger scale of this installation in transverse cross-section on the line III—III in FIG. 2;

FIG. 4 is a partial view of it to a different scale in longitudinal cross-section on the line IV—IV in FIG. 2;

FIG. 5 is a rear view of it to the same scale as FIG. 4 and as seen in the direction of the line V—V in FIG. 4;

FIG. 6 shows to a larger scale and partially cut away the detail indicated by a box VI in FIG. 5;

FIG. 7 shows to a still larger scale and in longitudinal cross-section the detail indicated by a box VII in FIG. 6;

FIG. 9 is a partial view in transverse cross-section analogous to that of FIG. 3 for an alternative embodiment;

FIG. 10 is a perspective view analogous to that of FIG. 2 for another embodiment.

Figure 1:
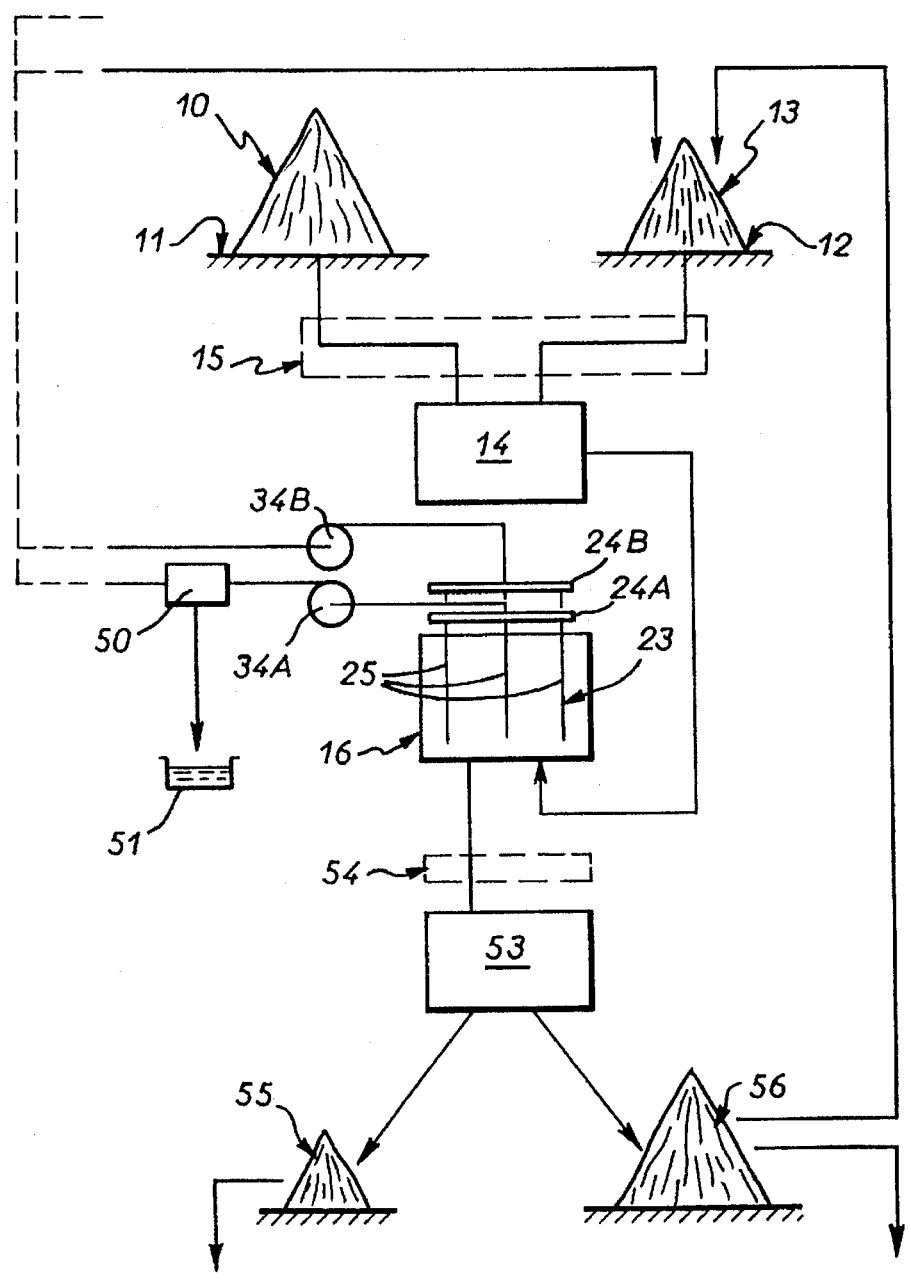
FIG. 1 is a block diagram showing the various stages in a treatment method in accordance with the invention.

As schematically shown in FIG. 1, the product 10 to be treated is stored on any storage area 11.

In the case of a wet product to be dehydrated, it is preferably stored under a cover, not shown.

The latter may advantageously be exploited to obtain preheating of the product 10 as a result of the greenhouse effect.

To this end it is sufficient to use a transparent cover.

In this case the air confined by the cover is itself preheated and this may be exploited with advantage, as will emerge later.

In the embodiment shown there is stored on another storage area 12 another product 13 to be mixed with the product 10 to be treated before the latter is treated, this other product 13 being chosen to confer upon the combination structural characteristics of a kind to facilitate the circulation of air through it.

Depending on the product 10 to be treated, this may be, if required, a product serving as a carbon-bearing support, for example, rind, peel or husks, lavender chaff, grape stalks, corn stalks, pruning waste, wooden boards, small crates or various other waste products of a plant-derived kind.

However, it may equally well be an inert and/or mineral product such as stones or gravel.

The product 13 to be mixed with the product 10 to be treated, if any, is in practise determined on the basis of experience and by virtue of arrangements which, being not in themselves related to the present invention, will not be described in detail here. At least one other additive may be added to it.

However, it goes without saying that if the product 10 to be treated has an inherently satisfactory structure it is not imperative to mix it with another product.

If, as in this case, and as schematically shown in full line 14 in FIG. 1, mixing of this kind is employed, it is preferably preceded, as schematically represented in dashed line 15 in FIG. 1, by appropriate metering of the various ingredients concerned.

With the materials being removed from the storage areas 11, 12 by means of a bucket-equipped device, such metering is very simply achieved by counting the number of buckets taken, for example one bucket of product 10 to be treated for one or two buckets of product 13.

If necessary, the mixing of the product 10 to be treated with the product 13 and any additive is accompanied by grinding of the combination.

The mixture obtained is then loaded into a reactor 16.

In the embodiment shown in FIGS. 2 through 4, the reactor is in the open air and is open at the top, being simply formed by walls 17, 18 directly upstanding from the ground 20 with a generally rectangular contour as seen in plan view.

In more precise terms, in this embodiment the reactor 16 has no fixed wall on one side so that a loading or offloading machine can enter it directly.

This permanent structure therefore comprises only two side walls 17 parallel to each other and a back wall 18 perpendicular to them.

These walls may be made from concrete or from building blocks.

However, in a very simple and economical way they are preferably built using metal posts 21 and wooden planks 22 spanning the gap between the former, the wooden planks 22 having inherent and beneficial thermal insulation qualities and being easily replaced if necessary.

The dimensions of the reactor 16 delimited in this way are immaterial.

To give an example, they may be in the order of 12 meters long by 2 meters high, but these numerical values must not be regarded as being in any way limiting of the invention.

However, the walls 17 and 18 which are intended to provide at least some lateral protection of the product to be treated preferably extend to at least half the height of the latter.

Also, there may be added to them if required and as schematically shown in chain-dotted outline in FIG. 2 a removable head wall 19 adapted to complete such lateral protection by closing off the fourth side of the reactor 16 after it is loaded.

The ground 20 may be the natural ground, treated to a greater or lesser degree, for example with sand-cement.

It may equally well be a lean concrete covering or road surfacing material.

It preferably has a slight slope to facilitate the draining off of water.

Be this as it may, the reactor 16 in accordance with the invention comprises at its base a perforated network 23 adapted to allow air to circulate through the mixture that it contains in parallel with two feed-pipes 24A, 24B, referred to hereinafter for convenience only as the primary feed-pipes, each adapted to be individually connected, by virtue of arrangements described in more detail later, to said perforated network 23, the first to aspirate air through the underlying mixture, the other to blow air into the latter.

In the embodiment shown in FIGS. 2 through 4 this perforated network 23 comprises a plurality of perforated pipes 25 extending parallel to each other and in practise parallel to the side walls 17 of the reactor 16; they are all connected at one end to the same feed-pipe 26, referred to hereinafter for convenience only as the secondary feed-pipe, disposed to the rear of the back wall 18 of the reactor 16; at their other end each is separately closed in the manner of a cul-de-sac.

In the embodiment shown three perforated pipes 23 are provided in this way so as to leave between them room for a loading and/or unloading machine, the distance between them corresponding to the track of this machine.

They are, for example, man-made material tubes having along their upper generatrix perforations 27 in the form of small transverse slots, for example. These tubes are preferably made from polyethelene, this material having the advantages of good resistance to punctures, low cost and relatively easy maintenance.

Be this as it may, the perforated pipes 25 used in this way are substantially flush with the ground 20, only their perforated part emerging therefrom.

In the embodiment shown in FIG. 3 the perforated pipes 25 are individually accommodated in respective channels 28 formed from building blocks, for example, enabling them to be changed easily should this be necessary.

As an alternative to this (FIG. 9) they may be directly buried in the ground 20.

Be this as it may, the perforated pipes 25 are preferably substantially horizontal with a slight backward slope towards the secondary feed-pipe 26 to which they are connected and they are associated with evacuation means adapted to draw off from them the water that condenses in them, these evacuation means comprising, for example, a pump 30 the inlet of which is connected to a pipe 35 which by means of appropriate branches penetrates into the lower part of the perforated pipe 25.

The outlet from the pump 30 is connected to the drainage system, for example, by a pipe 32.

In the embodiment shown the secondary feed-pipe 26 extends transversely relative to the perforated pipes 25 and is in the form of a section of pipe appropriately closed off at its ends.

Like the secondary feed-pipe 26, the primary feed-pipes 24A, 24B extend parallel to each other to the rear of the back wall 18 of the reactor 16 and are made of pipe sections, for example. Each is connected to a respective blower 34A, 34B that is not visible in FIGS. 2 through 4 but is schematically represented in FIG. 1.

Each of the primary feed-pipes 24A, 24B comprises a connecting Tee 35A, 35B inclined to a greater or lesser extent by which it can be connected by a flexible hose 36 (FIG. 5) to the perforated network 23 of the reactor 16.

In practise the flowrate of air circulating in the resulting reactor 16 is monitored by a control device comprising, in combination, a so-called control valve 37 and a so-called thermal sensor 38 which controls said control valve 37 and which, being responsive to temperature, is exposed to the air leaving the reactor 16.

In the embodiment shown the control valve 37 and the thermal sensor 38 are located inside a box 39 between the flexible hose 36 and the secondary feed-pipe 26. The control valve 37 as shown here is a butterfly valve, for example.

The thermal sensor 38 comprises a variable volume system which preferably contains a liquid with a high coefficient of thermal expansion and a mobile wall 43 of which is coupled to the control member 44 of the control valve 37.

In the embodiment shown the variable volume system of the thermal sensor 38 is formed by two containers 40, 41 the interior volumes of which are joined together by a pipe 42. The container 40 is larger than the container 41 and is fixed whereas the container 41 is smaller than the container 40 and incorporates the corresponding mobile wall 43.

Like the container 40, the container 41 may be disposed within the box 39.

It is only to clarify the diagram that it is shown outside the box 39 in FIG. 6.

In the embodiment shown the mobile wall 43 is formed by a piston, the corresponding container 41 being in the form of a syringe, for example.

As an alternative to this, the mobile wall 43 could equally form part of a bellows or even be itself in the form of a bellows.

Be this as it may, the mobile wall 43 is coupled to the control member 44 of the control valve 37 by a rod 45.

The control member 44 of the control valve 37 is, for example, a simple rigid link keyed to rotate with the spindle of the control valve 37, and the rod 45 is preferably flexible.

Furthermore, this flexible rod 45 is preferably coupled to the control member 44 in a manner such that its position is adjustable both longitudinally and transversely.

As shown in FIG. 7, for example, the control member 44 comprises a longitudinal series of holes 46 and the flexible rod 45, which is screwthreaded at the end, passes through one of these holes, being locked to the control member 44 in a manner such that its position is adjustable by two screws 47 on respective opposite sides of the member.

Of course, any other form of thermal sensor might prove suitable for controlling the control valve 37.

Furthermore, and as schematically represented in FIG. 6, there is also provided on the upstream side of the control valve 37, within the box 39, a so-called programming valve 48.

The valve 48 may be manually operated or motor-driven.

Furthermore, a single programming and control valve might be provided, governed by a servomotor, for example.

The various feed-pipes 24A, 24B and 26 used and the set of pipes serving them are preferably thermally insulated.

In practise, and as schematically represented in chain-dotted outline in FIG. 2, an installation in accordance with the invention comprises a battery of reactors 16 sharing the same primary feed-pipes 24A, 24B.

There may be four reactors 16, for example.

Be this as it may, the mixture to be treated is preferably loaded into a reactor 16 of this kind on top of a bed of rind, peel or husks to prevent blocking of the perforations 27 in the perforated pipes 25 at its base.

Some fermentation then occurs naturally in the mixture placed in this way in the reactor 16.

In accordance with the invention, to accelerate this fermentation air is circulated through the mixture during at least part of the time it spends in the reactor 16.

This circulation of air is essentially procured by aspiration from the primary feed-pipe 24A and is continuous.

To initiate the fermentation and/or to restart it at intervals hot and dry air may be blown from the primary feed-pipe 24B through the mixture being treated in the reactor 16.

It is sufficient on each such occasion to connect the flexible hose 36 either to the connector 35A on the primary feed-pipe 24A in the direction of the arrow FA in FIG. 4 or to the connector 35B on the primary feed-pipe 34B in the direction of the arrow FB in FIG. 4.

In either case the air pressure may be in the order of a few millibars, for example. In accordance with the invention, for the purposes of controlling the flowrate of air circulating in the reactor 16 the value of a parameter related to the state of the product 10 to be treated in the reactor 16 is measured and the measured value of this parameter is compared with a specific value, programmed in advance and regarded as ideal for the current air flowrate. This air flowrate is modified if the measured value of the parameter concerned departs from this ideal value.

In practise the parameter chosen to this end is the temperature of the exhaust air.

However, it could equally well be the relative humidity of the exhaust air or its composition, more particularly its enzyme content and the nature of such enzymes, or any other parameter representative at the time in question of the state of the product 10 being treated.

However, it is found that the temperature of the exhaust air is particularly meaningful in this regard and is easy to measure.

It is also found that after a certain time, in the order of one week, for example, the ideal value for the temperature of the exhaust air changes in a quasi linear manner.

Figure 8:
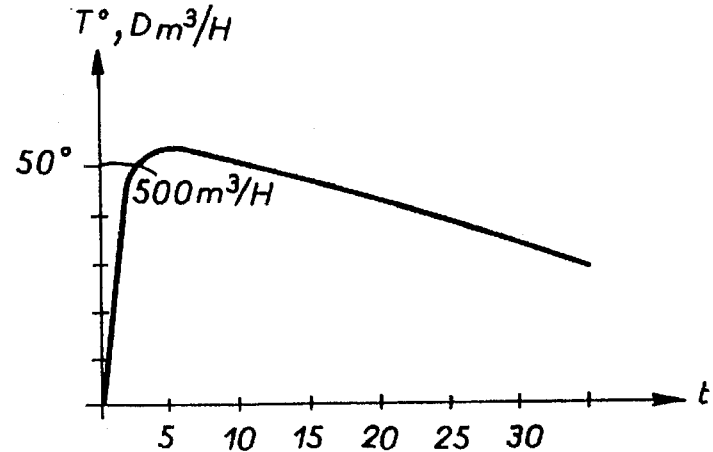
FIG. 8 is a diagram showing how a product changes during its treatment in the installation in accordance with the invention.

In the diagram in FIG. 8 the horizontal axis is graduated in terms of the time t (in days) and the vertical axis in terms of the temperature T (in degrees) of the air exhausting from the reactor 16 or the flowrate D (in $m^3$ per hour) of air aspirated through the reactor 16.

The corresponding curve initially rises in a relatively steeply sloped straight line and then decreases along a straight line of significantly less steep slope than the aforementioned line.

Of course, the amplitude of this curve varies from one product to another.

However, experience shows that for all materials the curve has substantially the same general shape.

During the first phase, in which the temperature increases, it is necessary to increase commensurately the flowrate of aspirated air.

During the second and longer phase in which the temperature decreases it is necessary to reduce commensurately the flowrate of air.

In practical terms, during the first five days in a reactor containing approximately 40 to 50 tonnes of product 10 to be treated it has been found possible to circulate approximately 500 $m^3$/h of air whose exhaust temperature is between 47° and 52° C., for example, and whose relative humidity is then equal to 100, which corresponds overall to the extraction of one tonne of water per day.

Between the fifth and the tenth days the temperature of the exhaust air is usually between only 47° C. and 40° C. and the aspirated air flowrate may be reduced to 450 $m^3$/h.

In the next five days the exhaust air temperature drops from 42° C. to 37° C. and the corresponding air flowrate may then be reduced to 400 $m^3$/h.

In the next five days the exhaust air temperature falls further between 37° C. and 32° C. and the corresponding air flowrate can then be limited to 350 m³/h.

After this it is possible either to continue to aspirate air or to temporarily blow in hot air to restart fermentation.

However, more often than not the overall treatment is not continued for more than one month.

In accordance with the invention, it is programmed appropriately.

For the increasing temperature phase the corresponding programing can be effected by action on the programming valve 48.

During the decreasing temperature phase the control device in accordance with the invention incorporating the control valve 37 and the thermal sensor 38 has the advantage of allowing, at least to a first approximation, this programming and the necessary control over the aspirated air flowrate to be exercized in a very simple manner.

If the temperature measured by the thermal sensor 38 rises it opens the control valve 37, so increasing the aspirated air flowrate.

Conjointly, if the measured temperature decreases the thermal sensor 38 itself commands closing of the control valve 37 and so concommitant reduction of the aspirated air flowrate.

In this way the control device in accordance with the invention itself provides the required linear relationship between changes in the exhaust air temperature and changes in the exhaust air flowrate.

For a particular product it is therefore sufficient to adjust the position of the flexible rod 45 of the thermal sensor 38 relative to the control member 44 of the control valve 37 as necessary, both longitudinally, a respective hole 46 being provided in the control member 44 for each product, and transversely, by means of the screws 47, in order to adjust the corresponding zero point.

If required the treatment in accordance with the invention can be interrupted temporarily to be resumed after mechanical handling of the product 10 treated, such as turning it over and/or screening.

Be this as it may, taken overall, the treatment in accordance with the invention is preferably continued for a sufficiently long time for the water content of the product 10 treated, measured as a percentage relative to the raw product 10, to be reduced by at least half.

Experience shows that the oxygen requirements of the treated product 10 are then amply satisfied and that the product 10 is in this manner suitably stabilized.

However, should it be required, the treated product 10 can then be further dried by circulating hot air in the reactor 16 to further reduce the water content.

Be this as it may, if, as in this instance, the product 10 to be treated has been mixed with another product 13, at the end of the time spent by the combination in the reactor 16 the two products 10 and 13 are separated out by screening, as schematically represented in full line at 53 in FIG. 1. This screening may be preceded by breaking up any clumps, schematically represented in dashed outline in FIG. 1.

Screening separates out from the treated mixture a relatively fine fraction 55 and a relatively coarse fraction 56.

The relatively fine fraction 55 is a product whose characteristics reflect those of the original product 10 but, as previously emphasized, with a significantly reduced water content, since this has been reduced by at least half.

This product may be regarded as a finished product or as a semi-finished product requiring further processing.

The relatively coarse fraction 56 corresponds to the other product 13 and may be entirely or partially recycled.

In practise between 70 and 80% of the other product 13 may be recycled.

In any event, the product 13 used is itself advantageously increased in value from the energy point of view, its water content also having been reduced.

The result of the foregoing is that the air leaving the reactor 16, extracted through the primary feed-pipe 24A, is hot and moist.

As schematically shown in FIG. 1, this exhaust air preferably enters some kind of heat engine 50, for example a simple heat pump, in order to recover from it at least some of its energy content.

In this way hot and dry air is extracted, which as schematically represented in dashed outline in FIG. 1 may be used for blowing hot and/or dry air into the reactor 16, as previously explained, to preheat the product 13 or for any other purpose, and water is also extracted, to be collected in a tank 51 or drained away.

If, as previously mentioned, the product 10 to be treated is stored under glass so that hot and moist air can also be recovered from the enclosed space, this hot and moist air can be treated and used in the same way.

In either case, it will be noted that the recovery of hot and moist air and therefore of energy is advantageously possible without any disturbance to the treatment method used and the energy recovered in this way is advantageously used in the treatment itself.

If, as previously mentioned, a battery of reactors 16 is used in parallel, each of the reactors 16 may advantageously correspond to a different stage in the evolution of the product 10 concerned.

For a better illustration of the capabilities of the invention there are explained hereinafter by way of non-limiting example the results of a number of tests applied to various products A through E.

These tests were carried out using four reactors each of 100 m³, with the average quantity of product treated per test being 40 tonnes.

In this table there are successively recorded line by line for each of the various products A through E concerned:

in column 1: the initial water content, in column 2: the final water content, in column 3: the quantity of water evaporated, in kg per tonne of product treated, whether there is any atmospheric precipitation or not, in column 4: the time in weeks spent in the reactor.

|   | 1 | 2 | 3 | 4 |
|---|---|---|---|---|
| A | 60% | 20–30% | 400–500 | 4–6 |
| B | 80–85% | 0–45% | 600–700 | 4–6 |
| C | 85–90% | 45–50% | <700 | 5 |
| D | 80% | 45% | 600 | 4 |
| E | 93% | 55% | >800 | |

In practise, the products treated were as follows:

A: effluent sludge from a gelatine factory, mixed with pine bark,

B: effluent sludge from a preserves manufacturing plant, mixed with pine bark,

C: effluent sludge from a pharmaceuticals industry installation using poppies, mixed with pine bark, D: byproducts of an industrial installation processing leather waste, mixed with pine bark, E: byproducts of an industrial installation extracting pectin from citrus fruits, mixed with corn stalks.

For products D and E additional drying with hot air enabled the water content to be reduced to 37%.

In the embodiment shown in FIG. 10 a reactor 16 in accordance with the invention is formed by a skip with the perforated pipes 25 that it incorporates accommodated in its longitudinal floor stiffening members 58.

This form of implementation has the advantages of immediate standardization and possible use for other applications.

It is also advantageously suitable for modular implementation, requires no building permit for its construction and can only reduce the environmental nuisance, given the possibility of moving it from one point of use to another and the ease of covering it if necessary.

The present invention is not limited to the embodiments described and shown but encompasses any variant execution and/or combination of the various parts thereof.

In particular, consideration may be given, especially in the case of a skip, to circulating air through the product to be treated from bottom to top, either by blowing in air from the base of the product or by aspiration from its top, the product to be treated being protected by a lid, for example, possibly surmounted by a funnel.

Electronic data processing means may also be employed for the required programming and/or control functions.

I claim:

1. Method for ventilating and controlling biological dehydration and stabilization treatment of a moist fermentable organic product or products comprising the steps of:

loading a reactor with a heap of the product or products to be treated;

applying suction or aspiration from beneath the heap to cause a flow of air through the heap at a desired flow rate;

measuring the temperature of air exhausted from the heap by expansion and contraction of a liquid having a high coefficient of thermal expansion;

programming a theoretical exhaust air temperature as a function of airflow rate;

comparing the theoretical value of the exhaust air temperature with a monitored exhaust air temperature and determining the deviation;

adjusting the exhaust airflow rate in response to the expansion or contraction of the liquid in such a manner that the monitored exhaust air temperature tends to reduce the magnitude of the deviation; and thereby allowing fermentation while progressively reducing moisture from the product or products.

2. Method for ventilating and controlling biological dehydration and stabilization treatment of a moist fermentable organic product or products comprising the steps of:

loading a reactor with a heap of the product or products to be treated;

applying suction or aspiration from beneath the heap to cause a flow of air through the heap at a desired flow rate;

measuring the temperature of air exhausted from the heap;

programming a theoretical exhaust air temperature as a function of airflow rate;

comparing the theoretical value of the exhaust air temperature with a monitored exhaust air temperature and determining the deviation;

adjusting the airflow rate in such a manner that the monitored exhaust air temperature tends to reduce the magnitude of the deviation;

thereby allowing fermentation while progressively reducing moisture from the product or products;

linearly varying the airflow rate after a predetermined initial period on the order of one week.

3. Method according to claim 1, further comprising successively loading respective reactors of a battery of reactors arranged in parallel so that treatment of the product or products takes place in stages.

4. Method according to claim 1, further comprising mixing at least one additional product into the heap prior to loading the product or products in the reactor, the at least one additional product having a combination of structural characteristics for facilitating the airflow through the heap and being selected from the group consisting of carbonaceous products of plant origin, inert products and mineral products.

5. Method according to claim 1, further comprising opening a roof of the reactor allowing the heap to communicate with the surroundings, the heap being substantially laterally protected by the reactor.

6. Method according to claim 5, further comprising laterally protecting the heap upto at least half of its height.

7. Method according to claim 1, further comprising blowing hot dry air upwardly from beneath the heap for initiating and/or restarting fermentation in the heap.

8. Apparatus for ventilating and controlling biological dehydration and stabilization treatment of a moist fermentable organic product or products comprising:

a reactor for containing a heap of a product or products to be treated;

means for applying suction or aspiration from at the base of the reactor and beneath the heap to cause a flow of air through the heap at a desired flow rate comprising a perforated network at the bottom of the reactor for the flow of air, and at least one primary feed-pipe connectable to the perforated network;

means for measuring the temperature of air exhausted from the heap comprising a thermal sensing means having a variable volume and containing a liquid with a high coefficient of thermal expansion and a mobile wall responsive to the expansion and contraction of the liquid;

a program of ideal theoretical airflow rate as a function of the measured exhaust air temperature;

means for comparing the theoretical value of the exhausted air temperature with a monitored exhaust air temperature and determining the deviation;

means for controlling the exhaust airflow rate in such a manner that the monitored exhaust air temperature tends to reduce the magnitude of the deviation, said means for controlling the exhaust airflow rate comprising a control valve having a control member coupled to the mobile wall; and thereby allowing fermentation while progressively reducing moisture from the product or products.

9. Apparatus according to claim 8, wherein the variable volume is formed by a relatively large and a relatively small container in communication with each other, the relatively large container having a fixed volume and the relatively small container incorporating the mobile wall to define a variable volume.

10. Apparatus according to claim 8, wherein the mobile wall is part of a bellows.

11. Apparatus according to claim 8, wherein the mobile wall is part of a bellows.

12. Apparatus according to claim 8, wherein the mobile wall is coupled to the control member so as to be adjustable longitudinally and transversely.

13. Apparatus according to claim 8, wherein another feed-pipe is connected to the perforated network for blowing hot dry air for initiating and/or restarting fermentation in the key.

14. Apparatus according to claim 13, wherein each of the feed-pipes comprises a connecting tee for connection through a flexible hose to the perforated network.

15. Apparatus according to claim 8, wherein the perforated network comprises a plurality of parallel perforated pipes, the plurality of pipes being connected to a common secondary feed-pipe at one end and closed individually as a dead end at the other end.

16. Apparatus according to claim 15, wherein the reactor comprises walls upstanding from the ground, the perforated pipes being substantially flush with the ground, only a perforate part of the perforated part projecting outwardly therefrom along a generatrix.

17. Apparatus according to claim 16, wherein the perforated pipes are each accommodated in a channel.

18. Apparatus according to claim 15, wherein the perforated pipes are directly buried in the ground.

19. Apparatus according to claim 15, wherein the perforated pipes are substantially horizontal with a slight backward inclination towards the secondary feed-pipe, the perforated pipes being associated with evacuation means adapted to draw off water condensing in the perforated pipes.

20. Apparatus according to claim 8, wherein the reactor is open on one side for entry and exit of a loading or unloading machine.

21. Apparatus according to claim 20, further comprising a removable head wall for closing of the open side of the reactor.

22. Apparatus according to claim 8, wherein the reactor is open roofed.

23. Apparatus according to claim 8, further comprising a battery of reactors arranged in parallel to each other.

* * * * *